(12) United States Patent
Ananth (10) Patent No.: US 9,361,209 B2
(45) Date of Patent: Jun. 7, 2016

(54) CAPTURING DOMAIN VALIDATIONS AND DOMAIN ELEMENT INITIALIZATIONS

(75) Inventor: Pavan V. Ananth, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 456 days.

(21) Appl. No.: 13/481,291

(22) Filed: May 25, 2012

(65) Prior Publication Data
US 2013/0318494 A1    Nov. 28, 2013

(51) Int. Cl.
*G06F 9/44* (2006.01)
*G06F 11/36* (2006.01)

(52) U.S. Cl.
CPC ............. *G06F 11/3688* (2013.01); *G06F 8/10* (2013.01); *G06F 8/20* (2013.01); *G06F 8/24* (2013.01); *G06F 8/30* (2013.01); *G06F 8/34* (2013.01); *G06F 9/4443* (2013.01); *G06F 11/3604* (2013.01)

(58) Field of Classification Search
CPC ............. G06F 8/20; G06F 8/30; G06F 8/10; G06F 8/34; G06F 8/24; G06F 9/4443; G06Q 10/06
See application file for complete search history.

(56) References Cited

U.S. PATENT DOCUMENTS

| | | | |
|---|---|---|---|
| 6,434,740 B1* | 8/2002 | Monday et al. | 717/108 |
| 6,851,105 B1* | 2/2005 | Coad et al. | 717/106 |
| 7,401,061 B2* | 7/2008 | Law | 706/47 |
| 7,480,893 B2 | 1/2009 | Berenbach et al. | |
| 7,853,922 B1* | 12/2010 | Szpak et al. | 717/105 |
| 7,975,254 B2 | 7/2011 | Gilboa | |
| 2002/0023261 A1* | 2/2002 | Goodwin et al. | 717/146 |
| 2003/0009455 A1* | 1/2003 | Carlson et al. | 707/6 |
| 2003/0046282 A1* | 3/2003 | Carlson et al. | 707/6 |
| 2005/0091093 A1* | 4/2005 | Bhaskaran et al. | 705/7 |
| 2005/0234957 A1* | 10/2005 | Olson et al. | 707/101 |
| 2006/0174222 A1* | 8/2006 | Thonse et al. | 717/106 |
| 2006/0200799 A1* | 9/2006 | Wills et al. | 717/109 |
| 2007/0005546 A1* | 1/2007 | Law | 706/47 |
| 2007/0033567 A1* | 2/2007 | Carlson et al. | 717/100 |
| 2007/0226681 A1* | 9/2007 | Thorup | 717/104 |
| 2008/0163159 A1 | 7/2008 | Oara et al. | |
| 2009/0113380 A1* | 4/2009 | Ploesser et al. | 717/104 |
| 2009/0228261 A1* | 9/2009 | Chulani et al. | 703/22 |

(Continued)

OTHER PUBLICATIONS

Fuhrmann et al., "Taming Graphical Modeling", Springer-Verlag Berlin Heidelberg, Oct. 3, 2010, Model 2010, Part I, LNCS 6394, pp. 196-210, 2010; <http://link.springer.com/chapter/10.1007%2F978-3-642-16145-2__14#page-1>.*

(Continued)

*Primary Examiner* — Thuy Dao
*Assistant Examiner* — Ben C Wang
(74) *Attorney, Agent, or Firm* — Cuenot, Forsythe & Kim, LLC (57) ABSTRACT

Specifying and/or enforcing a domain model can include generating a pictorial diagram specifying a rule within a development environment, wherein the pictorial diagram includes a first subject element specifying criteria for selecting artifacts within the development environment. The pictorial diagram can be enabled within the development environment. Responsive to an execution event, the pictorial diagram can be executed by selecting each artifact matching the criteria of the first subject element and performing the rule specified by the pictorial diagram upon each selected artifact within the development environment.

16 Claims, 3 Drawing Sheets

(56) References Cited

U.S. PATENT DOCUMENTS

| | | | |
|---|---|---|---|
| 2009/0287617 A1* | 11/2009 | Schmidt | 706/10 |
| 2009/0300579 A1* | 12/2009 | Dutta et al. | 717/105 |
| 2010/0011337 A1* | 1/2010 | Young et al. | 717/104 |
| 2010/0017792 A1* | 1/2010 | Young et al. | 717/162 |
| 2010/0306732 A1* | 12/2010 | Zhu | 717/105 |
| 2010/0325491 A1* | 12/2010 | Kumanan et al. | 714/38 |
| 2011/0088011 A1 | 4/2011 | Ouali | |
| 2011/0154288 A1* | 6/2011 | Kung | 717/105 |
| 2011/0258611 A1* | 10/2011 | Dutta et al. | 717/127 |
| 2011/0271246 A1* | 11/2011 | Fujihara | 717/104 |
| 2011/0283253 A1* | 11/2011 | Dutta et al. | 717/105 |
| 2012/0047130 A1* | 2/2012 | Perez et al. | 707/723 |
| 2012/0260227 A1* | 10/2012 | Shukla et al. | 717/104 |
| 2013/0318501 A1* | 11/2013 | Ananth | 717/125 |
| 2015/0100942 A1* | 4/2015 | Misbhauddin et al. | 717/104 |
| 2015/0220308 A1* | 8/2015 | Condon et al. | 717/125 |

OTHER PUBLICATIONS

Broll et al., "Extensible Visual Constraint Language", ACM, DSM'15, Oct. 27, 2015, pp. 63-70; <http://dl.acm.org/citation.cfm?id=2846704&CFID=756931351&CFTOKEN=93270414>.*

Salihbegovic et al., "Design of a domain specific language and IDE for Internet of things applications", IEEE, May 25, 2015, pp. 996-1001; <http://ieeexplore.ieee.org/stamp/stamp.jsp?tp=&arnumber=7160420>.*

Gil, J.Y., et al., "Towards a Formalization of Constraint Diagrams," [online] In Proc. 2002 IEEE CS Int'l. Sym. on Human-Centric Computing Languages and Environments (HCC) [retrieved May 25, 2012] retrieved from the Internet: <http://citeseerx.ist.psu.edu/viewdoc/summary?doi=10.1.1.104.3753>, 8 pgs.

Lukichev, S., "Rules Modeling and Validation," [online] Research Presentation, Jun. 17, 2006, <www.l3s.de/kweb/kwepsy2006/Slides/slides_lukichev.pdf>, 23 pgs.

Kent, S., "Constraint diagrams: visualising assertions in object-oriented models," [online] Proc. of 1997 ACM SIGPLAN Conf. on Object-Oriented Programming Systems, Languages & Applications (OOPSLA '97), Oct. 5-9, 1997, pp. 327-341, retrieved from the Internet: <kar.kent.ac.uk/.../Constraint_Diagrams_Visualising_Assertions_in.pdf>, 26 pgs.

* cited by examiner

CAPTURING DOMAIN VALIDATIONS AND DOMAIN ELEMENT INITIALIZATIONS

BACKGROUND

Creating a domain model for a system under development can be a cumbersome process. Rules relating to pre-configuration and initialization of artifacts and rules indicating the relationships among artifacts within the domain model for an object-oriented software system, for example, typically are created as series of text-based rules using a Universal Modeling Language (UML) application. To enforce the rules that are created, users need to pre-program the rules within the particular software system that is being modeled and subsequently developed in accordance with the domain model. As such, the software system is not extendible beyond the rules that are specified therein. Further, rules specified as part of the UML application are not easily visualized and, thus, are unintuitive.

BRIEF SUMMARY

One or more embodiments disclosed within this specification relate to creation of a domain model and enforcement of the domain model.

An embodiment can include a method. The method can include generating a pictorial diagram specifying a rule within a development environment, wherein the pictorial diagram includes a first subject element specifying criteria for selecting artifacts within the development environment. The pictorial diagram can be enabled within the development environment. Responsive to an execution event, the pictorial diagram can be executed by selecting each artifact matching the criteria of the first subject element and performing the rule specified by the pictorial diagram, using a processor, upon each selected artifact within the development environment.

Another embodiment can include a system. The system can include a processor configured to initiate executable operations. The executable operations can include generating a pictorial diagram specifying a rule within a development environment, wherein the pictorial diagram includes a first subject element specifying criteria for selecting artifacts within the development environment. The pictorial diagram can be enabled within the development environment. Responsive to an execution event, the pictorial diagram can be executed by selecting each artifact matching the criteria of the first subject element and performing the rule specified by the pictorial diagram upon each selected artifact within the development environment.

Another embodiment can include a computer program product. The computer program product can include a computer readable storage medium having program code embodied therewith that, when executed, configures a processor to perform executable operations. The executable operations can include generating a pictorial diagram specifying a rule within a development environment, wherein the pictorial diagram includes a first subject element specifying criteria for selecting artifacts within the development environment. The pictorial diagram can be enabled within the development environment. Responsive to an execution event, the pictorial diagram can be executed by selecting each artifact matching the criteria of the first subject element and performing the rule specified by the pictorial diagram upon each selected artifact within the development environment.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to creation of a domain model and enforcement of the domain model. In accordance with the inventive arrangements disclosed within this specification, a domain model can be specified in the form of one or more pictorial diagrams. Each pictorial diagram that is generated can specify a rule for the particular system that is being modeled and that is to be developed in accordance with the domain model. The rules specified by the pictorial diagrams can be enforced via a direct interpretation of the pictorial diagrams within a development environment while a software system is developed in accordance with the domain model.

Each of the pictorial diagrams specifies one or more aspects of the domain model and, thus, the software system, being developed. In one aspect, a pictorial diagram specifies an organizational action of the domain model and software system that can be applied within the development environment. In another aspect, a pictorial diagram specifies an initialization action that can be applied within the development environment. In still another aspect, a pictorial diagram can specify a validation action that can be applied within the development environment.

Figure 1:
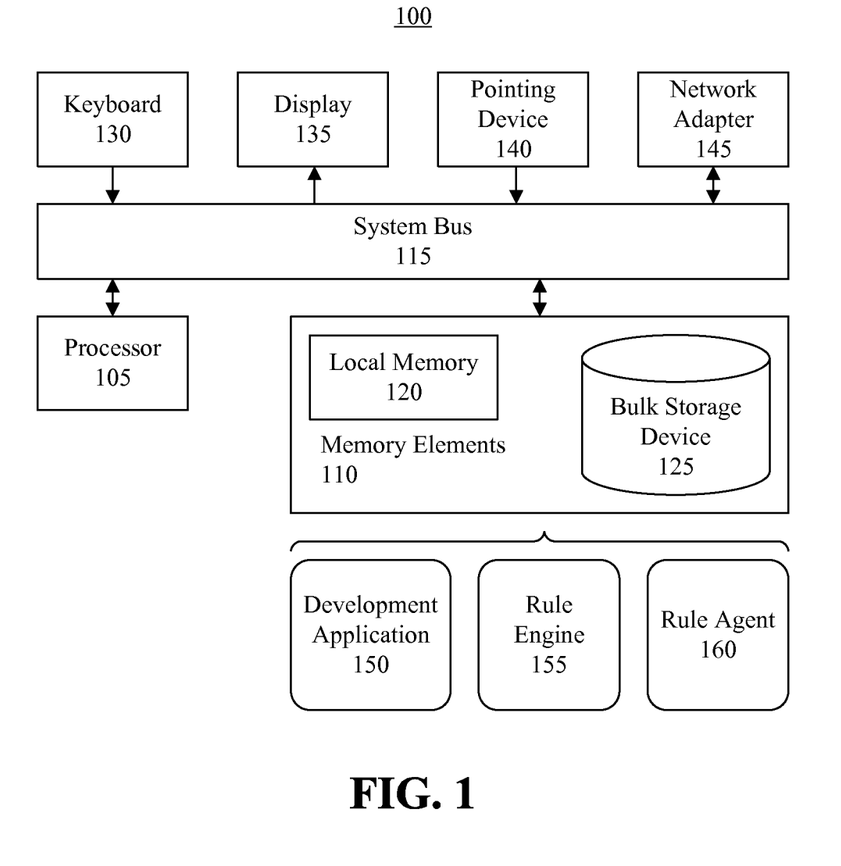
FIG. 1 is a block diagram illustrating an exemplary data processing system in accordance with an embodiment disclosed within this specification.

FIG. 1 is a block diagram illustrating an exemplary data processing system (system) 100 in accordance with an embodiment disclosed within this specification. System 100 can include at least one processor 105 coupled to memory elements 110 through a system bus 115 or other suitable circuitry. As such, system 100 can store program code within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system including a processor and memory that is capable of performing the functions and/or operations described within this specification.

Memory elements 110 can include one or more physical memory devices such as, for example, local memory 120 and one or more bulk storage devices 125. Local memory 120 refers to RAM or other non-persistent memory device(s) generally used during actual execution of the program code. Bulk storage device(s) 125 can be implemented as a hard disk drive (HDD), solid state drive (SSD), or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device 140 optionally can be coupled to system 100. The I/O devices can be coupled to system 100 either directly or through intervening I/O controllers. One or more network adapters 145 also can be coupled to system 100 to enable system 100 to become coupled to other systems, computer systems, remote printers, and/or remote storage devices through intervening private or public networks. Modems, cable modems, and Ethernet cards are examples of different types of network adapters 145 that can be used with system 100.

As pictured in FIG. 1, memory elements 110 can store a development application 150, a rule engine 155, and an optional rule agent 160. Development application 150, rule engine 155, and rule agent 160, each being implemented in the form of executable program code, can be executed by system 100 and, as such, can be considered part of system 100. In one aspect, development application 150, rule engine 155, and rule agent 160, executing within system 100, can be collectively referred to as the "development environment".

In one aspect, development application 150 can provide software development functions and domain model creation functions to a user. For example, development application 150 can provide, or include, a source code editor, a debugger, and/or one or more build automation tools. Development application 150, for instance, can provide the functionality, e.g., interface and functional components, through which a user can define or create the various pictorial diagrams that, when taken collectively, define a domain model for a software system to be developed or undergoing development.

In general, development application 150 can be used to specify, visualize, modify, and construct the various artifacts of a software system and, in particular, an object-oriented software system. The resulting domain model, as specified by one or more of the pictorial diagrams described within this specification, can serve as a blueprint specifying the architecture of the software system being modeled and to be developed.

Rule engine 155 can be configured to apply, e.g., execute or run, the pictorial diagrams that collectively specify the domain model. Through execution of the pictorial diagrams, the software system can be made or implemented to comply with the domain model that has been created. In one aspect, rule engine 155 can be implemented as a component or module of development application 150. Rule engine 155, for example, can be configured to understand the elements and/or relationships of the pictorial diagrams that specify the domain model. In one aspect, rule engine 155 can be configured to interpret, e.g., execute, the pictorial diagrams dynamically, e.g., as the software system is developed in accordance with the domain model.

Rule agent 160 can be configured to detect the creation of artifacts, e.g., program code or portions of the software system being modeled and developed that are governed by one or more of the pictorial diagrams. Responsive to detecting the creation or existence of an artifact that is governed by one or more pictorial diagrams, rule agent 160 can cause rule engine 155 to execute the relevant pictorial diagram(s) as described within this specification.

Figure 2:
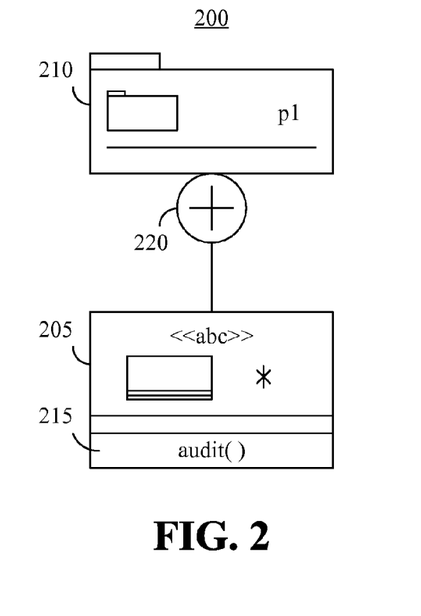
FIG. 2 is an example of a pictorial diagram in accordance with another embodiment disclosed within this specification.

FIG. 2 is an example of a pictorial diagram 200 in accordance with another embodiment disclosed within this specification. Each pictorial diagram, e.g., pictorial diagram 200, can be drawn by a user within the development environment. Each pictorial diagram visually specifies a rule, or rules, for the domain model. Further, each pictorial diagram, and the rule specified by the pictorial diagram, can be enforced during development of the software system defined by the domain model. Thus, rather than specify each rule of a domain model in the form of text, e.g., as a script, each rule for the domain model can be visually, e.g., graphically, specified in the form of a pictorial diagram. In this regard, unlike other systems, rules are stored pictorially and not as verbose data as in the case of systems that utilize a meta model. Rules do not exist independently or outside of the pictorial diagram(s) as is the case with a meta model.

Each pictorial diagram can include, or specify, one or more different elements. Two examples of elements that can be used to form a pictorial diagram can include a "subject" element and a "participant" element. A subject element can refer to a type and/or a subset of an artifact, e.g., a root entity, upon which an action can be applied. Each subject element can include an identifier. In one aspect, the identifier can be specified in the form of a regular expression. The identifier can specify criteria that can be used to filter artifacts for those that match or meet the criteria specified by the identifier. In general, the subject element is stored within the pictorial diagram itself as opposed to explicitly referencing elements in the domain model. Because the subject element specifies criteria to which artifacts are to be matched, a subject element can refer, or be applied, to artifacts that are not yet created or are created after the pictorial diagram including the subject element is generated.

A participant element refers to an artifact that "participates," e.g., is involved, in an action expressed by the pictorial diagram. A participant element indicates a single uniquely identifiable artifact and an artifact that actually does exist in the context, e.g., in the development environment and software system being developed. Unlike a participant element, a subject element can refer to one or more artifacts depending upon the particular criteria specified by the identifier. The participant element, unlike the subject element, references an actual artifact (e.g., explicitly references an existing and particular artifact) in the domain model.

In some cases, a pictorial diagram can include more than one participant for a single subject. In that case, the order of execution of the "rules" can be that internal participants are executed first with other participants being executed thereafter according to a numbering of relationships. An "internal participant" is an element or elements contained within a subject. Examples of internal participants can include attributes and operations for a class subject. An "external participant" is an element or elements that is outside the subject, e.g., various relationships. The ordering on the relationships can be by way of a numbering scheme that establishes the order of execution of the rules. Accordingly, the order of execution, when applicable, determines the order in which artifacts are created.

Returning to FIG. 2, pictorial diagram 200 specifies an exemplary initialization rule. As pictured, pictorial diagram 200 includes a subject element and a plurality of participant elements. The subject element is defined within block 205 and includes an identifier. The identifier specifies a criterion of all classes, as indicated by the asterisk ("*") symbol, that include the stereotype "abc". For purposes of illustration, stereotypes are enclosed by <<>>. Thus, the identifier applies to all classes that include the stereotype "abc".

A "stereotype" can refer to a domain model artifact that identifies the purpose of other domain model artifacts. Within the UML 2.1 specification, for example, a standard set of stereotypes are provided that can be applied to domain model artifacts. A stereotype, for example, can be used to refine the meaning of a model element. In illustration, the "library" stereotype can be applied to an artifact to indicate that the artifact is a specific type of artifact. Further examples of stereotypes can include, but are not limited to "call", "create", "instantiate", "send" or the like.

Participant elements of pictorial diagram 200 include P1, audit( ), and an ownership indicator 220. P1 specifies an actual package type of artifact of the software system being developed. Ownership indicator 220, in this example, can be a plus sign. Ownership indicator 220 indicates that each class having stereotype "abc" is owned by package P1. Ownership, in this example, specifies a relationship between classes including stereotype "abc" and package P1 within the software system being developed and also a structural or organizational relationship as described in further detail below. As shown, participant P1 is indicated in block 210, which is in contact with ownership indicator 220. Further, each class having "abc" as a stereotype is to include an "audit( )" function as specified in subsection 215 of block 205.

A developer can draw pictorial diagram 200 within a system such as system 100 of FIG. 1. Once pictorial diagram 200 is created and enabled, the system can execute the rule, or rules, in this example, specified by pictorial diagram 200. In one aspect, pictorial diagram 200 can be executed responsive to an execution event such as a user request to do so. In another aspect, pictorial diagram 200 can be executed when applicable, e.g., by a daemon such as rule agent 160 of FIG. 1. In either case, rule engine 155 can locate any existing class or a class that is being created that includes the stereotype "abc". Rule engine 155 can move the class into package P1, e.g., into a folder in the development environment that is reserved for artifacts owned by package P1, e.g., members of package P1. Thus, a structural and organizational function is served in that the classes are actually moved or relocated to appropriate locations within the development environment and within the software system being developed when pictorial diagram 200 is executed. Further, rule engine 155 can add or insert the audit( ) function into the class automatically without user intervention beyond specification of pictorial diagram 200 in graphic form as shown in FIG. 2.

Figure 3:
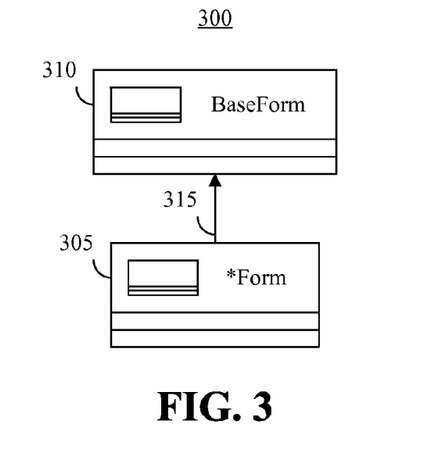
FIG. 3 is an example of a pictorial diagram in accordance with another embodiment disclosed within this specification.

FIG. 3 is an example of a pictorial diagram 300 in accordance with another embodiment disclosed within this specification. Pictorial diagram 300 specifies an exemplary initialization rule. In general, in the case of an initialization rule, a subject element has a defined relationship with a participant element. In this example, the subject element has a defined relationship with a single participant element.

Referring to FIG. 3, the subject element of pictorial diagram 300 is specified in block 305. The identifier within block 305 specifies a criterion of all classes having a name ending in "Form". The asterisk ("*") indicates that the class name specified by the subject can begin with any characters so long as each ends with "Form". The participant element in pictorial diagram 300 is the class having the name "BaseForm" specified in block 310. In this example, all classes having a name that ends in "Form" will have an inheritance relationship, as indicated by arrow 315, with the class named "BaseForm". As shown, arrow 315 points in the direction of the participant element from the subject element.

A developer can draw pictorial diagram 300 within a system such as system 100 of FIG. 1. Once pictorial diagram 300 is created and enabled, rule engine 155 can locate any existing class or a class that is being, or subsequently, created that has a name ending in "Form". Rule engine 155 can initialize the identified class(es) to have an inheritance relationship with the class named "BaseForm".

Figure 4:
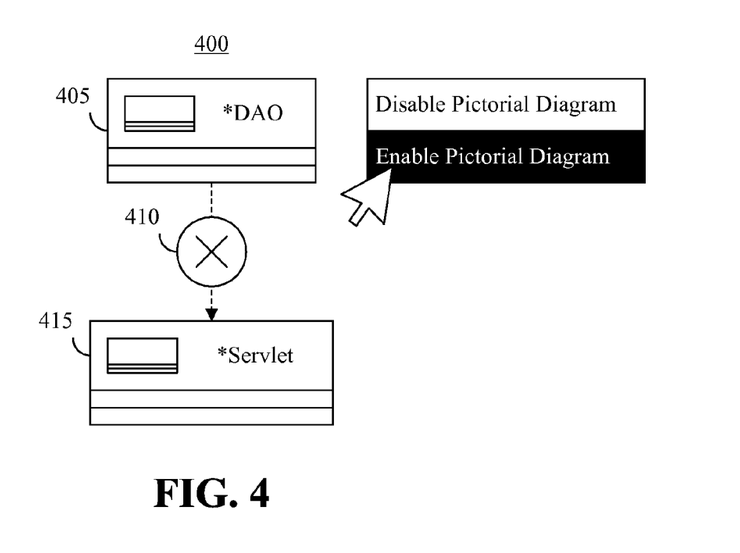
FIG. 4 is an example of a pictorial diagram in accordance with another embodiment disclosed within this specification.

FIG. 4 is an example of a pictorial diagram 400 in accordance with another embodiment disclosed within this specification. Pictorial diagram 400 specifies a validation rule. Unlike prior examples of rules, a pictorial diagram specifying a validation rule can include a subject element with a defined relationship to another, different subject element.

In this example, a first subject element is specified within block 405. The identifier of the first subject element, as specified within block 405, specifies a criterion of all classes having a name ending in "DAO". Symbol 410 indicates a forbidden, or disallowed, relationship with a second subject element specified in block 415. The second subject element specified in block 415 also includes an identifier that can be used to limit or filter membership therein. The criterion for the second subject element is all classes that have a name ending in "Servlet".

Accordingly, as specified by pictorial diagram 400, all classes having a name ending in "DAO" should not have a relationship with a class having a name ending in Servlet. Any such relationship that is detected within a system such as system 100 of FIG. 1 will be disallowed responsive to pictorial diagram 400 being enabled and executed. In the alternative, a system can cause a validation error to be generated when the software system is validated against the domain model as specified by one or more pictorial diagrams including pictorial diagram 400 in an enabled state once executed.

FIG. 4 illustrates another aspect in which a pictorial diagram can be disabled or enabled according to a received user input. For example, a user can select pictorial diagram 400 and access a menu, e.g., via a right click type of contextual menu, a drop down menu, or through any of a variety of know user interface elements. In this example, the user has selected "Enable Pictorial Diagram" thereby causing pictorial diagram 400 to be eligible for execution within the development environment. It should be appreciated that a user can enable or disable each pictorial diagram that is created as part of a domain model on an individual basis. Thus, each pictorial diagram that forms part of a domain model of the software system that is being developed can be enabled or disabled individually as desired during the development process. Only those pictorial diagrams that are enabled can be executed. Those pictorial diagrams that are not enabled are not eligible for execution and cannot be executed.

In one aspect, the pictorial diagrams illustrated within this specification can be implemented as a variation of a Universal Modeling Language (UML) diagram. Whereas conventional systems typically use UML diagrams to illustrate relationships that are initially defined through text or script form, the pictorial diagrams illustrated within this specification are drawn or created originally in graphic form and directly specify the structural behavior and the relationship dynamics of the various artifacts within the software system being modeled and developed. For example, each pictorial diagram can be implemented as a class diagram with added symbolism specifying relationships among artifacts, e.g., classes. The relationships can serve as a rule that can be enforced (e.g., executed) for the actual artifacts that are created within the software system.

By defining rules pictorially, defining the domain model becomes an intuitive process. Domain model validations can be performed using the pictorial diagrams. Results from the validations can show the particular portions of the software system that violate the rules specified by the pictorial diagrams. As new artifacts are created within the development environment for the software system, the new artifact can be initialized based on any pictorial diagrams specifying initialization rules. Any new elements created or new relationships drawn in violation of a pictorial diagram specifying a validation rule can be disallowed.

Figure 5:
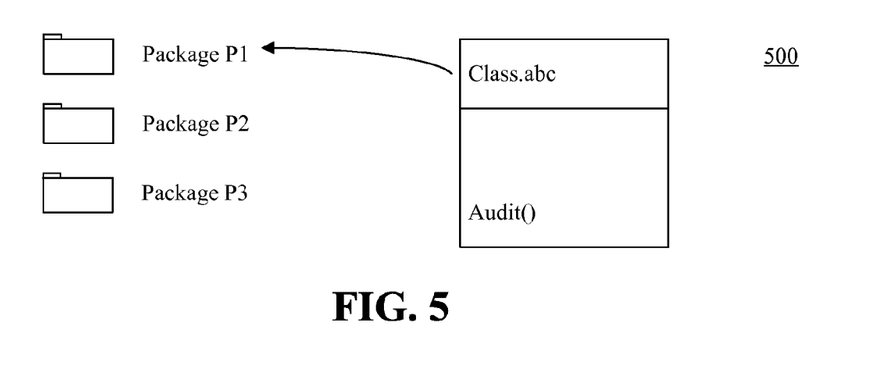
FIG. 5 is an example of a view of a development environment in accordance with another embodiment disclosed within this specification.

FIG. 5 is an example of a view 500 of a development environment in accordance with another embodiment disclosed within this specification. View 500 can be displayed by a system as described with reference to FIG. 1. View 500 illustrates processing that can be performed in executing a pictorial diagram such as pictorial diagram 200 of FIG. 2.

In the example shown, a class having a stereotype of "abc" can be displayed within an editing window. For example, a user can be writing the class illustrated. The system, in executing pictorial diagram 200, can determine that the class has a stereotype of "abc" and, as such, applies pictorial diagram 200 thereto. In this example, the system has inserted the audit( ) function within the class automatically, e.g., without the user having to manually code the inclusion of the audit( ) function. Further, the system can store, or move as the case may be, the actual file corresponding to the source code of the class having stereotype "abc" to a folder designated for storing artifacts owned by package P1. Thus, in executing pictorial diagram 200, the system inserts the function audit( ) into the class and stores the class at the designated location automatically during a development session without the developer having to do so.

Figure 6:
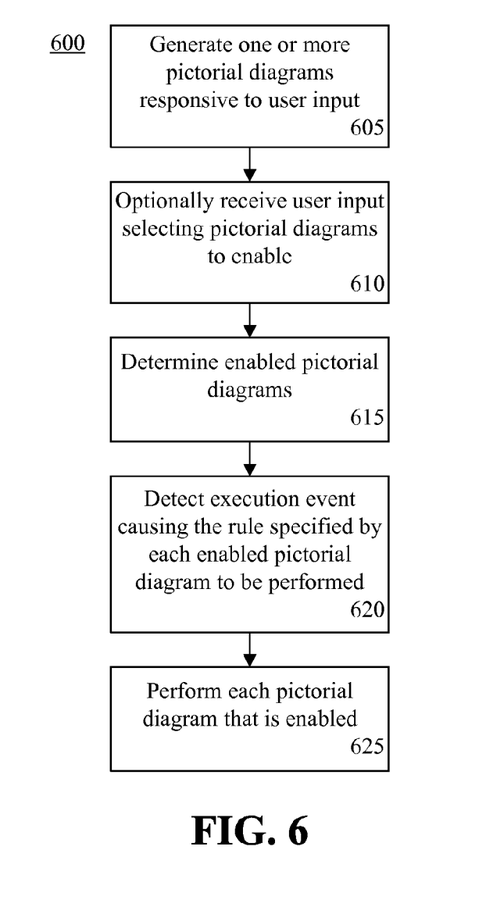
FIG. 6 is a flow chart illustrating a method of creating a domain model in accordance with another embodiment disclosed within this specification.

FIG. 6 is a flow chart illustrating a method 600 of creating a domain model in accordance with another embodiment disclosed within this specification. Method 600 can be implemented by a system as described with reference to FIGS. 1-5 of this specification. In general, a user can utilize the system to draw one or more pictorial diagrams that, once created and enabled, can be applied to development activities in the development environment, e.g., applied to the creation of source code for the software system.

Method 600 can begin in step 605 where one or more pictorial diagrams can be created responsive to user input. Each pictorial diagram, as noted, specifies a rule that can be applied within the development environment when coding the software system represented by the domain model formed by the pictorial diagrams. While each of the pictorial diagrams forming the domain model can be created prior to implementation of the software system, e.g., actual coding, it should be appreciated that pictorial diagrams can be created or deleted during development of the software system.

In step 610, the system optionally can receive user input selecting the pictorial diagrams that are to be enabled within the development environment and, thus, eligible for execution. As noted, each pictorial diagram can be enabled or disabled on an individual basis. In step 615, the system can determine the pictorial diagrams that are enabled. The system determines the pictorial diagrams that are enabled based upon the received user input described in step 610. Thus, only the enabled pictorial diagrams, e.g., the enabled portions of the domain model are subsequently enforced.

In step 620, the system can detect an execution event that causes one or more or all rules specified by enabled pictorial diagrams to be performed. In one aspect, one or more or all of the pictorial diagrams can be executed responsive to a user request to do so. For example, a user can request that one or more or all of the pictorial diagrams be executed from time to time or on-demand during development of the software system. Thus, responsive to a user request, the rule engine can perform each rule specified by a pictorial diagram selected by the user to execute.

In another aspect, an agent can continuously execute within the development environment and detect various execution events such as the creation of new artifacts or the like. The agent can invoke various rules that are applicable to the detected execution event as necessary. For example, a daemon can be configured to listen to changes in the root model. A listener, configured to accept domain model change deltas fed by the daemon, can process the deltas and identify a changed artifact.

In illustration, when a class is created that ends in "Form", the agent (e.g., the daemon) can detect the creation of that class, determine that a pictorial diagram applies to the class, and cause the pictorial diagram to be performed by the rule engine. Thus, performance of rules is automated and dynamically implemented as needed based upon the current state of the development environment as the user creates the software system defined by the domain model.

In step 625, the system can perform each rule specified by an enabled pictorial diagram per the conditions described. For example, the system can select each artifact matching the criteria specified by a subject element of the pictorial diagram. The system then can perform the rule, e.g., the actions of the rule, upon the selected artifacts.

The system can perform the rules specified by the pictorial diagrams using any of a variety of techniques. In one aspect, the pictorial diagrams can be parsed with the pictorial diagrams being translated into an executable form. For example, the parsing performed by the system, e.g., the rule engine, can identify the subject element and the participant elements for the subject element on the pictorial diagram, validate any repetition of subject elements on the pictorial diagram and optionally suggest the combining of multiple occurrences with a single consolidated occurrence. The system further can validate any conflicting rules on the same subject element, notify the user of the futility of such rules.

In another embodiment, the system optionally can create and maintain an internal map from the pictorial diagrams. The internal map can specify a correlation between each subject element with each participant element for the subject element. Using the map, the pictorial diagrams can be searched and/or queried to identify those pictorial diagrams that are to be executed responsive to execution events. In other embodiments, however, a map need not be created or used.

In another aspect, the pictorial diagrams can be queried to see whether an artifact matches any of the patterns listed in the keys or map keys if applicable. If so, the participant elements can be added or relationships drawn to participant elements as appropriate. In the case of a validation rule, for example, if a delta as determined by a daemon shows a state change on a domain model artifact, the new state can be validated against the map for correctness. If found incorrect, an error or warning may be thrown as appropriate.

Method 600 provides one example of a method of operation for a system. It should be appreciated that method 600 can iterate as may be required to receive further user input editing, creating, or deleting pictorial diagrams, enabling and/or disabling pictorial diagrams, etc. Accordingly, the system can continually apply those rules specified by pictorial diagrams that are enabled as described while a software development session is ongoing.

One or more aspects disclosed within this specification can be applied to other areas beyond model development in which organization of resources is needed. For instance, a pictorial diagram for a software development workbench can include containment relationships drawn between a working set with name "xyz" and all projects with JAVA nature (*). Responsive to creation of a new JAVA project in the workbench, the new project can be automatically added to the working set "xyz". In another example, a pictorial diagram for a file system can have a containment relationship drawn between a folder and all files with a particular extension such as ".mp3" (e.g., "*.mp3"). Responsive to a download or copy of any new file with the specified extension, the file can be moved automatically to the relevant folder.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a processor configured to initiate executable operations comprising:
generating a pictorial diagram specifying a rule within a development environment, wherein
the pictorial diagram comprises a first subject element specifying criteria for selecting artifacts within the development environment;
enabling the pictorial diagram within the development environment; and
responsive to an execution event, executing the pictorial diagram by selecting each artifact matching the criteria of the first subject element and performing the rule specified by the pictorial diagram upon each selected artifact within the development environment.

2. The system of claim 1, wherein
the pictorial diagram specifies an organizational rule and comprises a participant element, wherein
performing the rule comprises:
storing each selected artifact at a location specified by the participant element.

3. The system of claim 1, wherein
the pictorial diagram specifies an initialization rule and comprises a participant element, wherein
performing the rule comprises:
initializing each selected artifact using the participant element.

4. The system of claim 3, wherein
each selected artifact is initialized to include an additional artifact specified by the participant element.

5. The system of claim 3, wherein
the pictorial diagram specifies a relationship between each selected artifact and the participant element.

6. The system of claim 1, wherein
the pictorial diagram specifies a validation rule and comprises a second subject element specifying criteria selecting further artifacts, and wherein
the pictorial diagram specifies a disallowed relationship between artifacts matching the criteria of the first subject element and artifacts matching the criteria of the second subject element, wherein
performing the rule comprises:
determining whether any artifacts matching the first subject element have a disallowed relationship with artifacts matching the second subject element.

7. The system of claim 1, wherein
a plurality of pictorial diagrams are created and each pictorial diagram represents a different rule, wherein
each pictorial diagram is individually enabled within the design environment according to a user input.

8. The system of claim 1, wherein
the criteria of each subject is specified on the diagram as a regular expression.

9. A computer program product, comprising:
a computer readable storage medium excluding infrared medium having program code embodied therewith that, when executed, configures a processor to perform executable operations comprising:
generating a pictorial diagram specifying a rule within a development environment, wherein
the pictorial diagram comprises a first subject element specifying criteria for selecting artifacts within the development environment;
enabling the pictorial diagram within the development environment; and
responsive to an execution event, executing the pictorial diagram by selecting each artifact matching the criteria of the first subject element and performing the rule specified by the pictorial diagram upon each selected artifact within the development environment.

10. The computer program product of claim 9, wherein
the pictorial diagram specifies an organizational rule and comprises a participant element, wherein
performing the rule comprises:
storing each selected artifact at a location specified by the participant element.

11. The computer program product of claim 9, wherein
the pictorial diagram specifies an initialization rule and comprises a participant element, wherein
performing the rule comprises:
initializing each selected artifact using the participant element.

12. The computer program product of claim 11, wherein each selected artifact is initialized to include an additional artifact specified by the participant element.

13. The computer program product of claim 11, wherein the pictorial diagram specifies a relationship between each selected artifact and the participant element.

14. The computer program product of claim 9, wherein the pictorial diagram specifies a validation rule and comprises a second subject element specifying criteria selecting further artifacts, and wherein
the pictorial diagram specifies a disallowed relationship between artifacts matching the criteria of the first subject element and artifacts matching the criteria of the second subject element, wherein
performing the rule comprises:
determining whether any artifacts matching the first subject element have a disallowed relationship with artifacts matching the second subject element.

15. The computer program product of claim 9, wherein a plurality of pictorial diagrams are created and each pictorial diagram represents a different rule, wherein
each pictorial diagram within the design environment is individually enabled according to a user input.

16. The computer program product of claim 9, wherein the criteria of each subject is specified on the diagram as a regular expression.

* * * * *